US010672312B2

(12) United States Patent
Park

(10) Patent No.: US 10,672,312 B2
(45) **Date of Patent: *Jun. 2, 2020**

(54) ORGANIC LIGHT EMITTING DISPLAY DEVICE AND METHOD OF INSPECTING THE SAME

(71) Applicant: Samsung Display Co., Ltd., Yongin, Gyeonggi-Do (KR)

(72) Inventor: Sung Un Park, Suwon-si (KR)

(73) Assignee: Samsung Display Co., Ltd, Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/293,044

(22) Filed: Oct. 13, 2016

(65) Prior Publication Data

US 2017/0032724 A1 Feb. 2, 2017

Related U.S. Application Data

(63) Continuation of application No. 14/021,233, filed on Sep. 9, 2013, now Pat. No. 9,495,893.

(30) Foreign Application Priority Data

Apr. 3, 2013 (KR) ........................ 10-2013-0036525

(51) Int. Cl.
*G09G 5/10* (2006.01)
*G09G 3/30* (2006.01)
(Continued)

(52) U.S. Cl.
CPC ........... *G09G 3/006* (2013.01); *G09G 3/3208* (2013.01); *G09G 3/3258* (2013.01);
(Continued)

(58) Field of Classification Search
CPC . G02F 1/134363; G02F 1/1362; G02F 1/1345
See application file for complete search history.

(56) References Cited

U.S. PATENT DOCUMENTS 8,059,071 B2 11/2011 Kim et al.
2004/0081751 A1* 4/2004 Nakanishi ............. G02F 1/1345 427/108

(Continued)

FOREIGN PATENT DOCUMENTS

JP 2007-212690 8/2007
JP 2013-048109 3/2013

(Continued)

OTHER PUBLICATIONS

Office Action dated Jan. 22, 2019 issued in Korea Patent Application No. Oct. 2013-0036525.

*Primary Examiner* — Nan-Ying Yang
(74) *Attorney, Agent, or Firm* — H.C. Park & Associates, PLC

(57) ABSTRACT

An organic light emitting display device includes a display panel including a display area in which pixels are arranged and a non-display area disposed in vicinity of the display area, a scan driver applying scan signals to the pixels, a source driver chip connected to the non-display area to apply a data voltage to the pixels and generating an input signal, a light emitting control driver applying light emitting control signals to the pixels, a detecting capacitor disposed in the non-display area, and first and second test lines connected between the source driver chip and the detecting capacitor to apply the input signal to the detecting capacitor. The source driver chip outputs a charging time of the detecting capacitor on the basis of the input signal as an output signal.

21 Claims, 10 Drawing Sheets

(51) Int. Cl.

| | |
|---|---|
| ***G09G 3/36*** | (2006.01) |
| ***G06F 3/038*** | (2013.01) |
| ***G09G 5/00*** | (2006.01) |
| ***G09G 3/00*** | (2006.01) |
| ***G09G 3/3208*** | (2016.01) |
| ***G09G 3/3258*** | (2016.01) |
| ***G09G 3/3266*** | (2016.01) |
| ***G09G 3/3275*** | (2016.01) |

(52) U.S. Cl.
CPC ......... *G09G 3/3266* (2013.01); *G09G 3/3275* (2013.01); *G09G 2300/0426* (2013.01); *G09G 2310/0251* (2013.01); *G09G 2310/08* (2013.01); *G09G 2320/0626* (2013.01); *G09G 2380/02* (2013.01)

(56) References Cited

U.S. PATENT DOCUMENTS

2005/0174500 A1 8/2005 Shiraki et al.
2008/0036704 A1* 2/2008 Kim ..................... G09G 3/3233 345/76
2008/0106619 A1 5/2008 Sumiya
2012/0139829 A1 6/2012 Anno et al.
2015/0068897 A1* 3/2015 Neel ....................... G06F 3/044 204/407

FOREIGN PATENT DOCUMENTS

KR 10-2005-0079636 8/2005
KR 10-0739335 7/2007
KR 1020110008665 A 1/2011
KR 1020110132532 A 12/2011

* cited by examiner

ORGANIC LIGHT EMITTING DISPLAY DEVICE AND METHOD OF INSPECTING THE SAME

CROSS-REFERENCE TO RELATED APPLICATION

This application is filed under 35 U.S.C. § 120 as a continuation of U.S. patent application Ser. No. 14/021,233, filed on 9 Sep. 2013, which claims priority under 35 U.S.C. § 119 to and the benefit of Korean Patent Application No. 10-2013-0036525, filed on Apr. 3, 2013 in the Korean Intellectual Property Office, the entire contents of which are hereby incorporated by reference in its entirety.

BACKGROUND OF THE INVENTION

Field of the Invention

The present disclosure relates to an organic light emitting display device and a method of inspecting the organic light emitting display device, and more particularly, to an organic light emitting display device including a defect detecting capacitor and a method of inspecting the organic light emitting display device by using the defect detecting capacitor.

Description of the Related Art

In recent years, an organic light emitting display device has been spotlighted as a next generation display device since it has superior brightness and viewing angle and does not need to include a separate light source when compared to a liquid crystal display. The organic light emitting display device displays an image using an organic light emitting diode that emits light using recombination of electrons and holes. The organic light emitting display device has properties, e.g., fast response speed, low power consumption, high brightness, etc.

In general, the organic light emitting display device includes a display panel including pixels each in which an image is displayed, a scan driver sequentially applying scan signals to the pixels, a data driver applying data voltages to the pixels, and a light emitting control driver applying light emitting control signals to the pixels.

The pixels receive the data voltages in response to the scan signals. The pixels generate light with predetermined brightness to correspond to the data voltages, thereby displaying desired images. The pixels generate the light during a predetermined light emitting time controlled by the light emitting control signals.

In recent years, display panels with flexible property have been developed by using a flexible substrate, e.g., a plastic substrate, and the flexible display panel is employed in the organic light emitting display device. However, when the flexible display panel is bent, a defect, e.g., crack, occurs on the flexible display panel.

SUMMARY OF THE INVENTION

The present disclosure provides an organic light emitting display device capable of detecting a defect.

The present disclosure provides a method of inspecting the organic light emitting display device.

Embodiments of the inventive concept provide an organic light emitting display device including a display panel that includes a display area in which a plurality of pixels is arranged and a non-display area disposed in the vicinity of the display area, a scan driver that applies scan signals to the pixels, a source driver chip connected to the non-display area to apply a data voltage to the pixels and generating an input signal, a light emitting control driver that applies light emitting control signals to the pixels, a first detecting capacitor disposed in the non-display area, and first and second test lines connected between the source driver chip and the first detecting capacitor to apply the input signal to the first detecting capacitor. The source driver chip outputs a charging time of the first detecting capacitor on the basis of the input signal as an output signal.

The non-display area includes a first non-display area disposed adjacent to an upper side of the display area and connected to the source driver chip, a second non-display area disposed adjacent to a left side of the display area and including the scan driver disposed therein, a third non-display area disposed adjacent to a lower side of the display area, and a fourth non-display area disposed adjacent to a right side of the display area and including the light emitting control driver disposed therein, and the first detecting capacitor is disposed in the second, third, and fourth non-display areas.

The source driver chip includes a defect detection part that generates the input signal and applies the generated input signal to the first detecting capacitor through the first and second test lines.

The defect detection part includes a first node connected to the first test line and a second node connected to the second test line, and the defect detection part outputs the output signal measured between the first node and the second node.

The first detecting capacitor includes a first electrode connected to the first test line, a second electrode connected to the second test line and overlapped with the first electrode, and an insulating layer disposed between the first electrode and the second electrode.

The first electrode is disposed at a position outer than the scan driver in the second non-display area and the second electrode is disposed at a position outer than the light emitting control driver in the fourth non-display area.

Embodiments of the inventive concept provide a method of inspecting an organic light emitting display device, which includes a display panel including a display area in which a plurality of pixels is arranged and a non-display area disposed adjacent to the display area, in which a first detecting capacitor is disposed, and a source driver chip connected to the non-display area to generate an input signal, including preparing the display panel, generating the input signal, applying the input signal to the first detecting capacitor, outputting a charging time of the first detecting capacitor according to the input signal as an output signal, and comparing a rising time of the output signal to a first time period to detect a defect in the display panel.

The detecting of the defect of the display panel includes determining the display panel in a normal state when the rising time of the output signal is equal to the first time period and determining the display panel in an abnormal state in which the defect occurs when the rising time of the output signal has a second time period smaller than the first time period.

Embodiments of the inventive concept provide an organic light emitting display device including a display panel that includes a display area in which a plurality of pixels is arranged and a non-display area disposed adjacent to the display area, a scan driver that applies scan signals to the pixels, a source driver chip connected to the non-display area to apply a data voltage to the pixels and generating an input signal, a light emitting control driver that applies light emitting control signals to the pixels, first, second, and third detecting capacitors disposed in the non-display area, and a plurality of test lines connected between the source driver chip and the first, second, and third detecting capacitors to apply the input signal to the first, second, and third detecting capacitors. The source driver chip selectively applies the input signal to the first, second, and third detecting capacitors through the test lines and outputs a charging time of the first, second, and third detecting capacitors as an output signal.

The non-display area includes a first non-display area disposed adjacent to an upper side of the display area and connected to the source driver chip, a second non-display area disposed adjacent to a left side of the display area and including the scan driver and the first detecting capacitor, which are disposed therein, a third non-display area disposed adjacent to a lower side of the display area and including the second detecting capacitor disposed therein, and a fourth non-display area disposed adjacent to a right side of the display area and including the third detecting capacitor disposed therein.

The source driver chip includes a defect detection part that generates an input voltage, first and second lines connected to the defect detection part to receive the input voltage, and a demultiplexer connected to the first and second lines to receive the input voltage and selectively apply the input voltage to the first, second, and third detecting capacitors.

The defect detection part includes a first node connected to the first test line and a second node connected to the second test line, and the defect detection part outputs the output signal measured between the first node and the second node.

The test lines include first and second test lines connected between the demultiplexer and the first detecting capacitor, third and fourth test lines connected between the demultiplexer and the second detecting capacitor, and fifth and sixth test lines connected between the demultiplexer and the third detecting capacitor.

The demultiplexer includes a first switching device turned on in response to a first switching control signal to apply the input signal to the first detecting capacitor through the first and second test lines, a second switching device turned on in response to a second switching control signal to apply the input signal to the second detecting capacitor through the third and fourth test lines, and a third switching device turned on in response to a third switching control signal to apply the input signal to the third detecting capacitor through the fifth and sixth test lines.

The first detecting capacitor includes a first electrode connected to the first test line, a second electrode connected to the second test line and overlapped with the first electrode, and an insulating layer disposed between the first electrode and the second electrode, and the first and second electrodes are disposed at positions outer than the scan driver.

The second detecting capacitor includes a third electrode disposed in the third non-display area, a fourth electrode overlapped with the third electrode in a predetermined area of the third non-display area, and an insulating layer disposed between the third electrode and the fourth electrode. The third electrode is extended to the second non-display area and disposed at a position outer than the scan driver, and the fourth electrode is extended to the fourth non-display area and disposed at a position outer than the light emitting control driver.

The third detecting capacitor includes a fifth electrode connected to the fifth test line, a sixth electrode connected to the sixth test line and overlapped with the fifth electrode, and an insulating layer disposed between the fifth electrode and the sixth electrode. The fifth and sixth electrodes are disposed at positions outer than the light emitting control driver.

According to the above, the organic light emitting display device and the inspecting method may detect the defect occurring in the display panel.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION OF THE INVENTION

Hereinafter, the present invention will be explained in detail with reference to the accompanying drawings.

Figure 1:
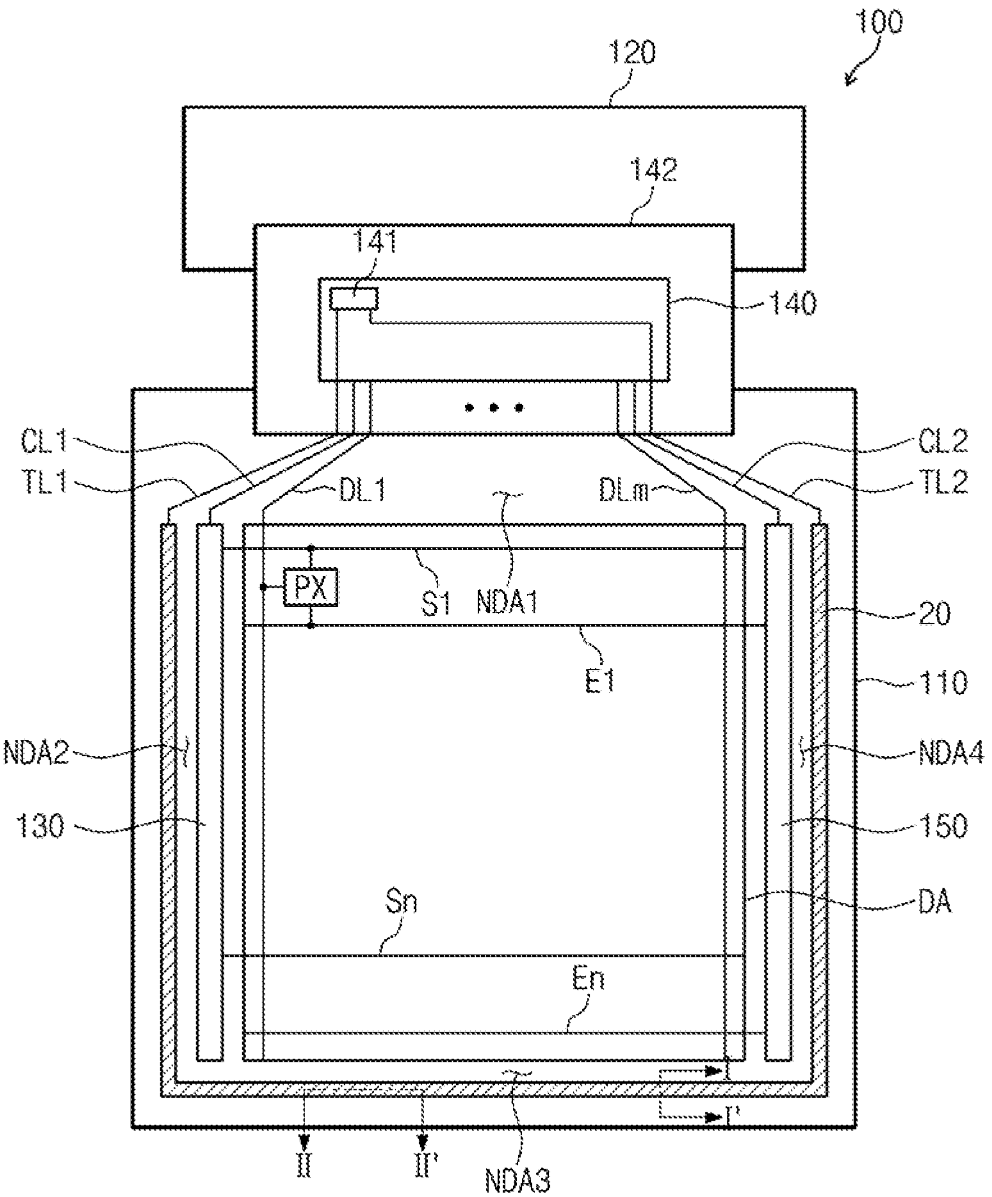
FIG. 1 is a plan view showing an organic light emitting display device constructed as an embodiment according to the principles of the present invention.
Figure 2:
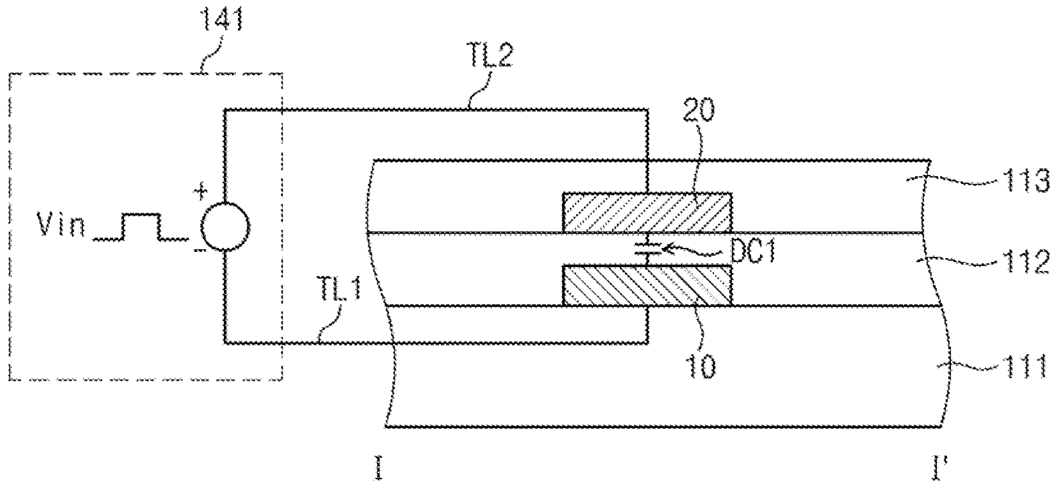
FIG. 2 is a cross-sectional view taken along a line I-I' shown in FIG. 1.

FIG. 1 is a plan view showing an organic light emitting display device constructed as an embodiment according to the principles of the present invention and FIG. 2 is a cross-sectional view taken along a line I-I' shown in FIG. 1.

Referring to FIGS. 1 and 2, an organic light emitting display device 100 includes a display panel 110, a driving circuit board 120, a scan driver 130, a source driver chip 140, and a light emitting control driver 150.

The display panel 110 includes a display area DA and a non-display area NDA1, NDA2, NDA3, and NDA4 disposed in the vicinity of the display area DA when viewed in a plan view. The non-display area NDA1, NDA2, NDA3, and NDA4 includes a first non-display area NDA1 disposed adjacent to an upper side of the display area DA, a second non-display area NDA2 disposed adjacent to a left side of the display area DA, a third non-display area NDA3 disposed adjacent to a lower side of the display area DA and opposite to the first non-display area NDA1, and a fourth non-display area NDA4 disposed adjacent to a right side of the display area DA and opposite to the second non-display area NDA2.

The display panel 110 includes a plurality of pixels PX, a plurality of scan lines S1 to Sn, a plurality of data lines DL1 to DLm, a plurality of light emitting control lines E1 to En, a plurality of control lines CL1 and CL2, a plurality of test lines TL1 and TL2, and a first detecting capacitor DC1. Each of m and n is an integer number greater than zero (0).

The pixels PX are arranged in a matrix form in the display area DA. The pixels PX are connected to the scan lines S1 to Sn extended in a row direction and the data lines DL1 to DLm crossing the scan lines S1 to Sn. In addition, the pixels PX are connected to the light emitting control lines E1 to En extended substantially in parallel to the scan lines S1 to Sn.

The scan lines S1 to Sn are connected to the scan driver 130 to receive scan signals. The data lines DL1 to DLm are connected to the source driver chip 140 to receive data voltages. The light emitting control lines E1 to En are connected to the light emitting control driver 150 to receive the light emitting control signals.

The control lines CL1 and CL2 include a first control line CL1 and a second control line CL2. The first control line CL1 is connected to the scan driver 130 and the source driver chip 140. The second control line CL2 is connected to the light emitting control driver 150 and the source driver chip 140.

The source driver chip 140 is mounted on a flexible printed circuit board 142 and connected to the driving circuit board 120 and the first non-display area NDA1 of the display panel 110.

Although not shown in figures, a timing controller mounted on the driving circuit board generates a first control signal, a second control signal, a third control signal, and image signals. The first control signal is applied to the scan driver 130 through the source driver chip 140 and the first control line CL1. The second control signal and the image signals are applied to the source driver chip 140. The third control signal is applied to the light emitting control driver 150 through the source driver chip 140 and the second control line CL2.

The scan driver 130 is disposed in the second non-display area NDA2 of the display panel 110. The scan driver 130 generates the scan signals in response to the first control signal provided through the first control line CL1. The scan signals are sequentially applied to the pixels PX through the scan lines S1 to Sn in the unit of row.

The source driver chip 140 generates data voltages corresponding to the image signals in response to the second control signal. The data voltages are applied to the pixels PX through the data lines DL1 to DLm, respectively.

The light emitting control driver 150 is disposed in the fourth non-display area NDA4 of the display panel 110. The light emitting control driver 150 generates the light emitting control signals in response to the third control signal provided through the second control line CL2. The light emitting control signals are sequentially applied to the pixels PX through the light emitting control lines E1 to En, respectively.

The pixels PX are applied with the data voltages in response to the scan signals. The pixels PX generate light with predetermined brightness, which corresponds to the data voltages, to display a desired image. The light emitting time of the pixels is controlled by the light emitting control signals.

The source driver chip 140 includes a defect detection part 141. The defect detection part 141 generates an input signal Vin. The input signal Vin serves as a test pulse signal. In the present embodiment, the defect detection part 141 is provided as a part of the source driver chip 140, but it should not be limited thereto or thereby. That is, the defect detection part 141 may be mounted on the flexible printed circuit board 142 on which the source driver chip 140 is no mounted.

The first detecting capacitor DC1 is formed in the second, third, and fourth non-display areas NDA2, NDA3, and NDA4 to surround the display area DA. In detail, in the second, third, and fourth non-display areas NDA2, NDA3, and NDA4, the display panel 110 includes a first substrate 111, a first electrode 10 disposed on the first substrate 111, a first insulating layer 112 disposed on the first substrate 111 to cover the first electrode 10, a second electrode 20 disposed on the first insulating layer 112, and a second insulating layer 113 disposed on the first insulating layer 112 to cover the second electrode 20.

The first electrode 10 and the second electrode 20 are overlapped with each other while interposing the first insulating layer 112 therebetween and surround the display area DA in the second, third, and fourth non-display areas NDA2, NDA3, and NDA4. That is, the first electrode 10 and the second electrode 20 overlapped with each other have a laid U shape. In FIG. 1, for the convenience of explanation, only the second electrode 20 disposed above the first electrode 10 has been shown. The first detecting capacitor DC1 is formed by the first electrode 10, the second electrode 20 overlapped with the first electrode 10, and the first insulating layer 112 disposed between the first and second electrodes 10 and 20.

The first electrode 10 is disposed at a position outer than the scan driver 130 in the second non-display area NDA2. The second electrode 20 is disposed at a position outer than the light emitting control driver 150 in the fourth non-display area NDA4.

The test lines TL1 and TL2 include a first test line TL1 and a second test line TL2. The test line TL1 and the second test line TL2 are connected to the defect detection part 141 of the source driver chip 140 and the first detecting capacitor DC1 through the flexible printed circuit board 142. As shown in FIG. 2, the first test line TL1 is connected to the defect detection part 141 and the first electrode 10 of the first detecting capacitor DC1. In addition, the second test line TL2 is connected to the defect detection part 141 and the second electrode 20 of the first detecting capacitor DC1.

As an example, the first test line TL1 is extended to the second non-display area NDA2 and connected to the first electrode 10, and the second test line TL2 is extended to the fourth non-display area NDA4 and connected to the second electrode 20. However, the arrangement of the first and second test lines TL1 and TL2 should not be limited thereto or thereby. For instance, the first test line TL1 is extended to the fourth non-display area NDA4 and connected to the first electrode 10, and the second test line TL2 is extended to the second non-display area NDA2 and connected to the second electrode 20.

The input signal Vin generated by the defect detection part 141 is applied to the first detecting capacitor DC1 through the first and second test lines TL1 and TL2 as shown in FIG. 2. The first detecting capacitor DC1 may be charged with a voltage corresponding to the input signal Vin. A charging time of the first detecting capacitor DC1 may be measured by the defect detection part 141 on the basis of an output signal. Due to the measured output signal, defects on the display panel 110 may be detected. This will be described in detail with reference to FIGS. 3 to 5.

Figure 3:
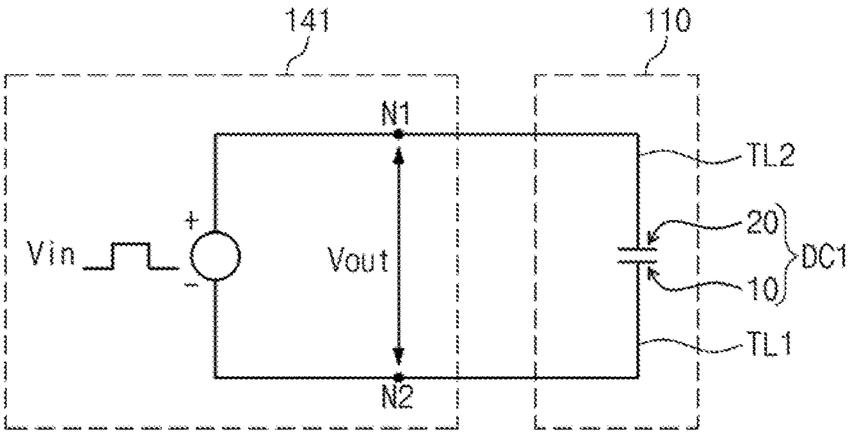
FIG. 3 is an equivalent circuit diagram of a defect detection part and a first detecting capacitor shown in FIG. 1.

FIG. 3 is an equivalent circuit diagram of the defect detection part and the first detecting capacitor shown in FIG. 1.

Referring to FIG. 3, the defect detection part 141 generates the input signal Vin. Although not shown in figures, the defect detection part 141 may include a pulse generator to generate a test pulse signal as the input signal Vin.

As described above, the input signal Vin generated by the defect detection part 141 is applied to the first detecting capacitor DC1 through the first and second test lines TL1 and TL2. For instance, the input signal Vin includes a positive (+) voltage and a negative (−) voltage. The negative (−) voltage is applied to the first electrode 10 through the first test line TL1 and the positive (+) voltage is applied to the second electrode 20 through the second test line TL2. Although not shown in figures, the negative (−) voltage may be a ground voltage. The first detecting capacitor DC1 is charged with the voltage corresponding to the input signal Vin.

The defect detection part 141 includes a first node N1 connected to the first test line TL1 and a second node N2 connected to the second test line TL2. The output signal Vout may be measured between the first node N1 and the second node N2 of the defect detection part 141. The output signal Vout may be defined as the charging time of the first detecting capacitor DC1. The charging time of the first detecting capacitor DC1 is varied depending on a variation of capacitance of the first detecting capacitor DC1. The capacitance of the first detecting capacitor DC1 is changed depending on the defect of the first detecting capacitor DC1. The defect detection part 141 outputs the output signal Vout.

In a case that the display panel 110 has flexibility and is bent, defects may occur on the first and second electrodes 10 and 20 forming the first detecting capacitor DC1, or the first insulating layer 112 disposed between the first electrode 10 and the second electrode 20. In this case, the capacitance of the first detecting capacitor DC1 is varied. According to the variation of the capacitance of the first detecting capacitor DC1, the charging time of the first detecting capacitor DC1 is changed, and this state is detected through the output signal Vout.

Although not shown in figures, the output signal Vout output from the defect detection part 141 may be applied to an external test device (not shown) to check whether the defect occurs on the display panel 110 or not. That is, when the defect does not occur on the first electrode 10, the second electrode 20, or the first insulating layer 112 and the capacitance of the first detecting capacitor DC1 is in a normal state, the normal output signal Vout is output and the display panel 110 works normally.

However, when the capacitance of the first detecting capacitor DC1 is varied by the defect occurring on the first electrode 10, the second electrode 20, or the first insulating layer 112, the output signal Vout is abnormally output. In this case, the display panel 110 works abnormally. For instance, due to the bending of the display panel 110, the defect occurs in the first detecting capacitor DC1 and the other area of the display panel 110, in which the first detecting capacitor DC1 is not disposed. The variation of the first detecting capacitor DC1, which is caused by the defect, is detected through the output signal Vout. In this case, it is checked that the defect occurs in the other area of the display panel 110, in which the first detecting capacitor DC1 is not disposed.

The defect of the first detecting capacitor DC1 and the charging time of the first detecting capacitor DC1 according to the defect of the first detecting capacitor DC1 will be described with reference to FIGS. 4A, 4B, 4C, and 5.

Figure 4A:
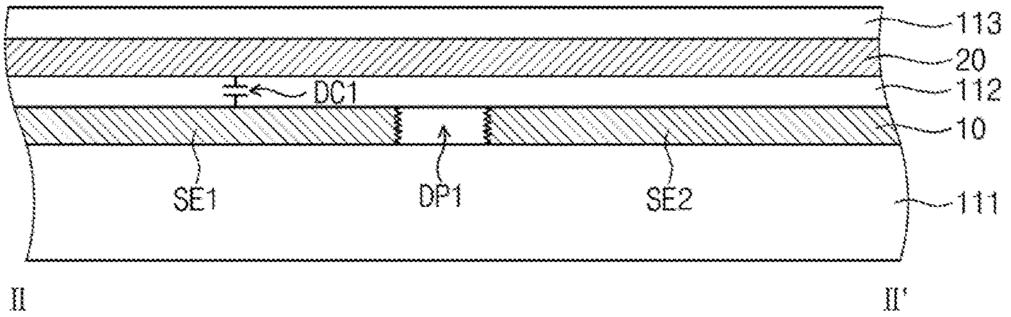
FIGS. 4A, 4B, and 4C are cross-sectional views taken along a line II-II' shown in FIG. 1.
Figure 4B:
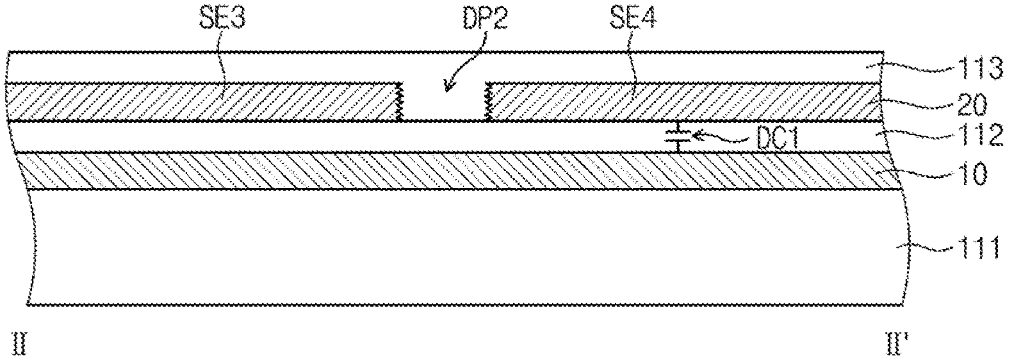
Figure 4C:
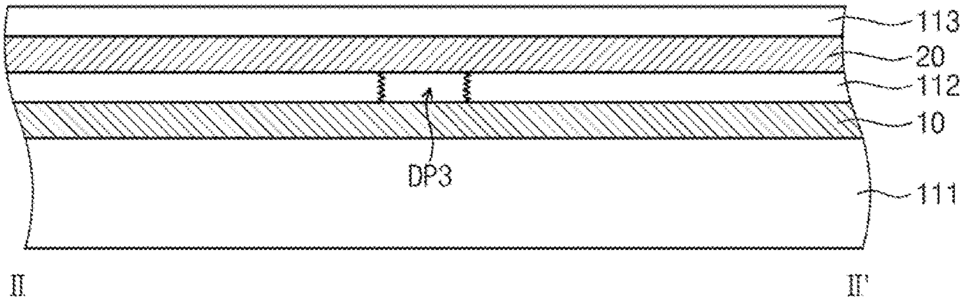

FIGS. 4A, 4B, and 4C are cross-sectional views taken along a line II-II' shown in FIG. 1.

FIGS. 4A, 4B, and 4C show various defects of the first detection capacitor DC1, which are caused by the bending of the display panel 110.

Referring to FIGS. 4A and 4B, a first defect DP1 may occur on the first electrode 10 or a second defect DP2 may occur on the second electrode 20. Although not shown in figures, the defect may occur on the first and second electrodes 10 and 20. The first and second defects DP1 and DP2 are cracks formed when the first and second electrodes 10 and 20 are split by external force.

The capacitance of the capacitor is proportional to an overlap area between two electrodes facing each other while interposing a dielectric substance therebetween and is inversely proportional to a distance between the two electrodes. When one or more electrodes of the two electrodes is cracked and separated in plural portions, the capacitance of the capacitor is reduced by the cracked electrode.

As shown in FIG. 4A, when the first defect DP1 occurs in the first electrode 10, the first electrode 10 is cracked by the first defect DP1, and thus the first electrode 10 is separated into a first sub-electrode SE1 disposed at a left side and a second sub-electrode SE2 disposed at a right side. As shown in FIG. 4B, when the second defect DP2 occurs in the second electrode 20, the second electrode 20 is cracked by the second defect DP2, and thus the second electrode 20 is separated into a third sub-electrode SE3 disposed at a left side and a fourth sub-electrode SE4 disposed at a right side.

The second electrode 20 is connected to the second test line TL2. The first sub-electrode SE1 of the first electrode 10 is connected to the first test line TL1 and the second sub-electrode SE2 of the first electrode 10 is not connected to the first test line TL1 due to the first defect DP1.

The input signal Vin is applied to the first sub-electrode SE1 of the first electrode 10 and the second electrode 20 through the first and second test lines TL1 and TL2. Accordingly, the capacitance of the first detecting capacitor DC1 is determined by the area of the first sub-electrode SE1 of the first electrode 10 and the area of the second electrode 20, which is overlapped with the first sub-electrode SE1 of the first electrode 10.

The overlap area between the first sub-electrode SE1 and the second electrode 20 when the first defect DP1 occurs in the first electrode 10 is smaller than the overlap area between the first and second electrodes 10 and 20 when no defect occurs in the first and second electrodes 10 and 20. Therefore, the capacitance of the first detecting capacitor DC1 becomes smaller when the first defect DP1 occurs in the first electrode 10 than the capacitance of the first detecting capacitor DC1 when the defect does not occur in the first and second electrodes 10 and 20.

Similarly, when the second defect DP2 occurs in the second electrode 20, the capacitance of the first detecting capacitor DC1 is determined by the area of the fourth sub-electrode SE4 of the second electrode 20 and the area of the first electrode 10, which is overlapped with the fourth sub-electrode SE4 of the second electrode 20. Thus, the capacitance of the first detecting capacitor DC1 becomes smaller when the second defect DP2 occurs in the second electrode 20 than the capacitance of the first detecting capacitor DC1 when the defect does not occur in the first and second electrodes 10 and 20.

Although not shown in figures, the capacitance of the first detecting capacitor DC1 becomes smaller when the defect occurs in the first and second electrodes 10 and 20 than the capacitance of the first detecting capacitor DC1 when the defect does not occur in the first and second electrodes 10 and 20.

Referring to FIG. 4C, a third defect DP3 may occur in the first insulating layer 112. The first insulating layer 112 may be an inorganic insulating layer, e.g., silicon nitride (SiNx). When the third defect DP3 occurs in the first insulating layer 112, the third defect DP3 is filled with air. The silicon nitride (SiNx) has a dielectric constant of about 6.9 farad/meter and the air has a dielectric constant of about 1.0005 farad/meter. That is, the dielectric constant of the air is lower than the dielectric constant of the first insulating layer 112.

The capacitance of the capacitor is proportional to the dielectric constant of the dielectric substance disposed between the two electrodes. The first insulating layer 112 and the air may serve as the dielectric substance. The third defect DP3 is filled with the air and the dielectric constant of the air is lower than that of the first insulating layer 112. Accordingly, the dielectric constant of the dielectric substance of the first detecting capacitor DC1 becomes lower when the third defect DP3 occurs in the first insulating layer 112 than the dielectric constant of the dielectric substance of the first detecting capacitor DC1 when the third defect DP3 does not occur in the first insulating layer 112. That is, the capacitance of the first detecting capacitor DC1 becomes smaller when the third defect DP3 occurs in the first insulating layer 112 than the capacitance of the first detecting capacitor DC1 when the third defect DP3 does not occur in the first insulating layer 112.

Figure 5:
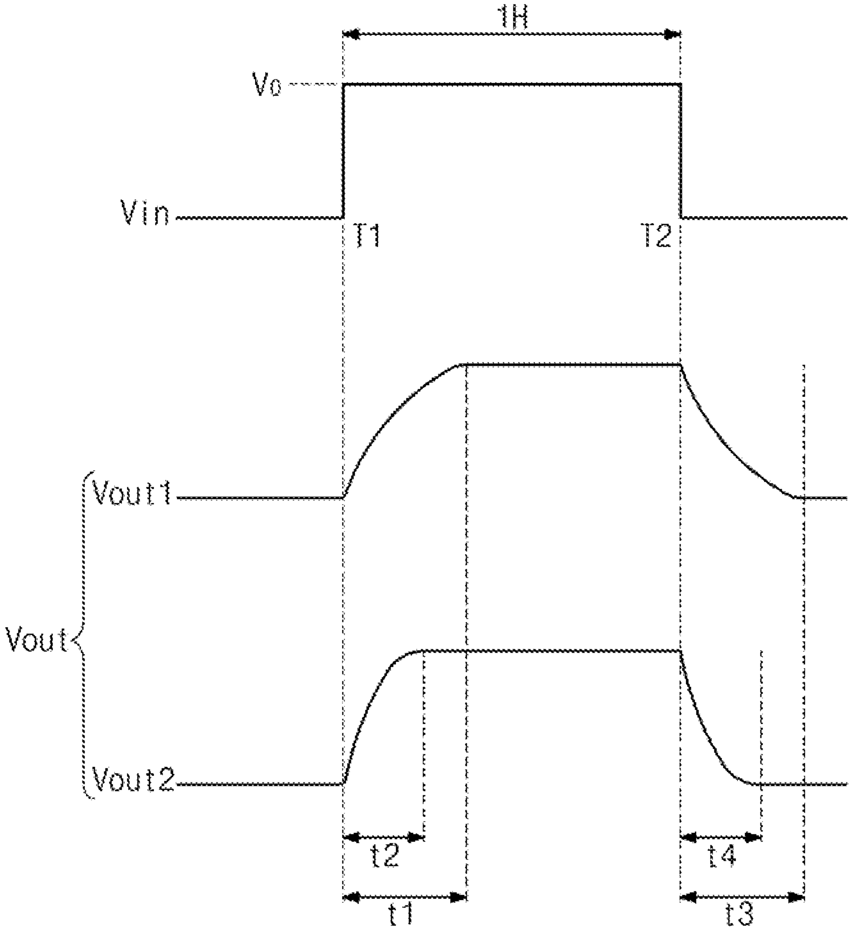
FIG. 5 is a timing diagram showing an input signal and an output signal of the defect detection part shown in FIG. 1.

FIG. 5 is a timing diagram showing the input signal and the output signal of the defect detection part shown in FIG. 1.

Referring to FIG. 5, the input signal Vin is a pulse signal having a first period 1H and having a amplitude of $V_0$, starting from time T1 and ending at time T2. The input signal Vin has a high level during the first period 1H. The first period 1H may be larger than a threshold period which may be determined by $RC_0$, wherein $C_0$ is the capacitance of the first detecting capacitor DC1 when no defect occur in the first electrode 10, the second electrode 20, and the first insulating layer 112, and R is the resistance of a resistor (not shown) disposed on the charging path of the first detecting capacitor DC1. To allow the first detecting capacitor DC1 to be charged with a threshold level Vth of the input signal Vin, the first period 1H may be at least no less than RC if the threshold level Vth is set to about 63.2% of the amplitude $V_0$ of input signal Vin. For another example, if Vth is set to about 95% of the amplitude $V_0$ of the input signal Vin, the first period 1H may be at least no less than 3RC. The output signal Vout includes a first output signal Vout1 and a second output signal Vout2.

The first output signal Vout1 may be defined as the charging time of the first detecting capacitor DC1 when the defect does not occur in the first electrode 10, the second electrode 20, and the first insulating layer 112. That is, the first output signal Vout1 may be the output signal Vout between the first node N1 and the second node N2 when the defect does not occur in the first electrode 10, the second electrode 20, and the first insulating layer 112. A rising time of the first output signal Vout1 corresponds to a first time period t1. The rising time of the first output signal Vout1 indicates a time required to allow the first output signal Vout1 to be charged with the threshold level Vth of the amplitude $V_0$ of the input signal Vin. The first time period t1 is determined by equation (1) below:

$$t1 = R \cdot C_0 \cdot \ln\left(\frac{V0}{V0 - Vth}\right) \qquad \text{Equation (1)}$$

The second output signal Vout2 may be defined as the charging time of the first detecting capacitor DC1 when the defect occurs in the first electrode 10, the second electrode 20, or the first insulating layer 112. That is, the second output signal Vout2 may be the output signal Vout between the first node N1 and the second node N2 when the defect occurs in the first electrode 10, the second electrode 20, and the first insulating layer 112. A rising time of the second output signal Vout2 corresponds to a second time period t2. The rising time of the second output signal Vout2 indicates a time required to allow the second output signal Vout2 to be charged with the threshold level Vth of the amplitude $V_0$ of the input signal Vin. The second time period t2 is determined by equation (2) below:

$$t2 = R \cdot C \cdot \ln\left(\frac{V0}{V0 - Vth}\right) \qquad \text{Equation (2)}$$

C in equation (2) is the capacitance of the first detecting capacitor DC1 when the defect occurs in the first electrode 10, the second electrode 20, or the first insulating layer 112.

As described above, when the defect occurs in the first electrode 10, the second electrode 20, or the first insulating layer 112, the capacitance of the first detecting capacitor DC1 is reduced. As shown in equations (1) and (2) above, the rising time is proportional to the capacitance of the first detecting capacitor DC1, since R, $V_0$, and Vth are constants. That is, as the capacitance of the first detecting capacitor DC1 becomes larger, the rising time becomes longer, and as the capacitance of the first detecting capacitor DC1 becomes smaller, the rising time becomes shorter.

When the defect occurs in the first electrode 10, the second electrode 20, or the first insulating layer 112, the capacitance of the first detecting capacitor DC1 is reduced. Thus, the rising time of the output signal Vout has the second time period t2 shorter than the first time period when the defect occurs in the first electrode 10, the second electrode 20, or the first insulating layer 112.

As described above, the output signal Vout is applied to an external test device (not shown) to check whether the defect occurs on the display panel 110 or not. When the output signal Vout is the first output signal Vout1, the display panel 110 is in the normal state. When the output signal Vout is the second output signal Vout2, the display panel 110 is in the abnormal state. That is, when the output signal Vout has the first time period t1 as the rising time, the display panel 110 is in the normal state, and when the output signal Vout has the second time period t2 as the rising time, the display panel 110 is in the abnormal state.

The aforementioned embodiment detects the defect occurring in the display panel 110 using the rising time of the output signal Vout. Alternatively, the falling time of the output signal Vout may be used to detect the defect occurring in the display panel 110 according to another embodiment of the present invention.

If the first period 1H lasts long enough, the first detecting capacitor DC1 may be charged to about the amplitude $V_0$ of the input signal Vin. For example, if the first period 1H lasts $5RC_0$, the first output signal Vout1 is about 99.3% of the amplitude $V_0$ of the input signal Vin. For the sake of explanation, the output signal Vout is assumed to be about the amplitude $V_0$ of the input signal Vin at time T2 after the first detecting capacitor DC1 is charged for a long enough period. When the pulse of the input signal Vin ends at time T2, the first detecting capacitor DC1 may start to be discharged via the resistor (not shown). Consequently, the first output signal Vout1 and the second output signal Vout2 may start to fall from time T2. Since the charging rate and discharge rate of the first detecting capacitor DC1 are the same to each other, the falling time t3 of the first output signal Vout1 and the falling time t4 of the second output signal Vout2 may also be used to detect the defect occurring in the display panel 110, similar to the aforementioned embodiment. Further descriptions of using the falling time to detect the defect will be omitted for the sake of brevity.

Consequently, the organic light emitting display device 100 may detect the defect occurring in the display panel 110.

Figure 6:
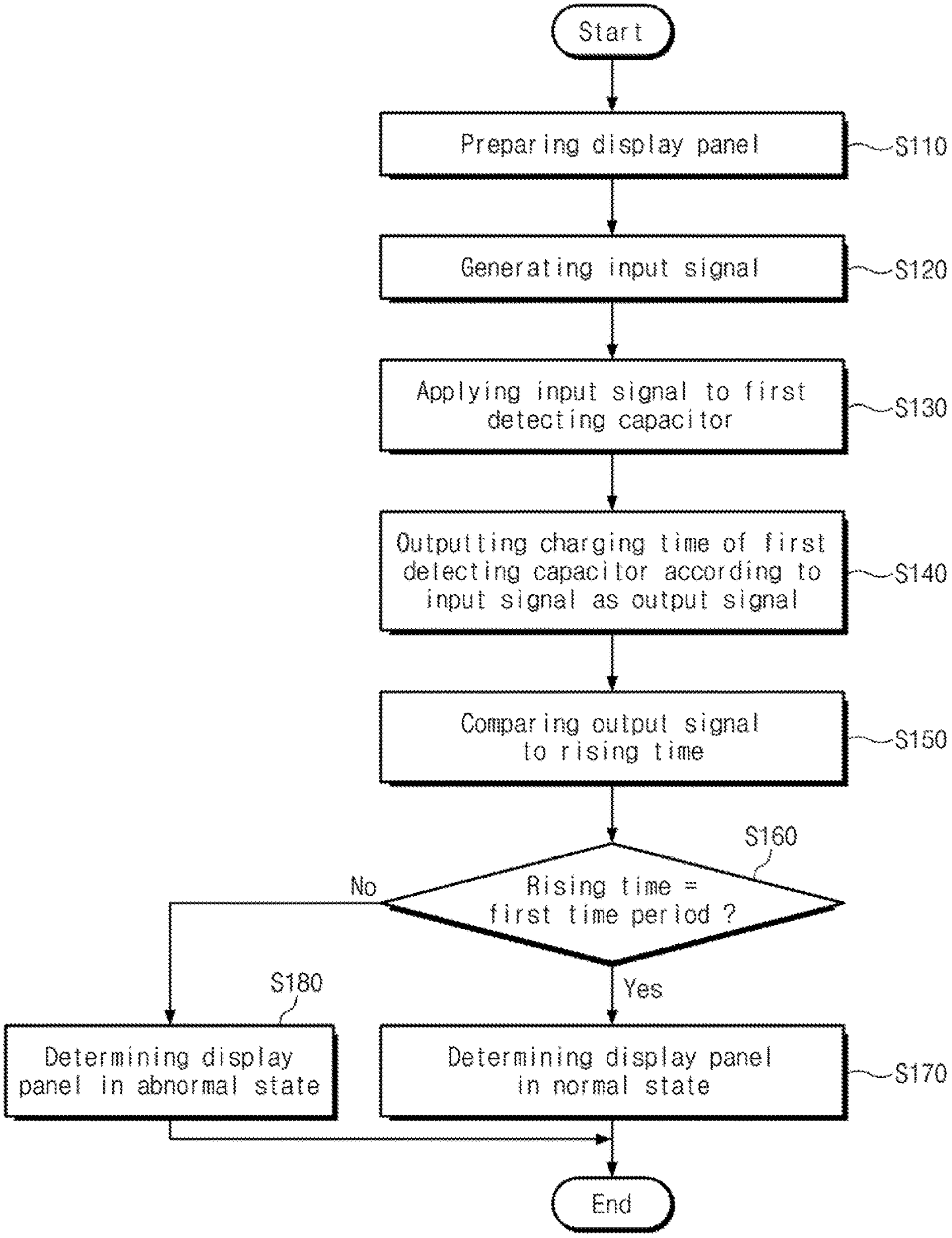
FIG. 6 is a flowchart showing an inspecting method of an organic light emitting display device constructed as an embodiment according to the principles of the present invention.

FIG. 6 is a flowchart showing an inspecting method of the organic light emitting display device according to an embodiment of the present invention.

Referring to FIG. 6, the display panel 110 is prepared (S110). As described above, the first detecting capacitor DC1 is formed in the second, third, and fourth non-display areas NDA2, NDA3, and NDA4, and the source driver chip 140 that generates the input signal Vin is connected to the first non-display area NDA1.

Then, the input signal is generated (S120). In detail, the defect detecting part 141 of the source driver chip 140 generates the input signal Vin as the test pulse signal.

The input signal Vin is applied to the first detecting capacitor DC1 (S130). Accordingly, the first detecting capacitor DC1 may be charged with the voltage corresponding to the input signal Vin.

The charging time of the first detection capacitor DC1 according to the input signal Vin is output as the output signal Vout (S140). In detail, the defect detection part 141 of the source driver chip 140 detects the charging time of the first detecting capacitor DC1 as the output signal Vout and outputs the output signal Vout.

The rising time of the output signal Vout is compared with the first time period t1 (S150). As described above, when the defect does not occur in the first electrode 10, the second electrode 20, and the first insulating layer 112, the rising time of the output signal Vout has the first time period t1. However, when the defect occurs in the first electrode 10, the second electrode 20, or the first insulating layer 112, the rising time of the output signal Vout does not have the first time period t1. That is, when the defect occurs in the first electrode 10, the second electrode 20, or the first insulating layer 112, the rising time of the output signal Vout has the second time period t2 smaller than the first time period t1.

When the rising time of the output signal Vout is equal to the first time period t1 (S160), the display panel 110 is in the normal state (S170). When the rising time of the output signal Vout is different from the first time period t1 (S160), the display panel 110 is in the abnormal state (S180).

Although not shown in FIG. 6, according to another embodiment of the present invention, in steps S150 and S160, the falling time of the output signal Vout may be compared with the third time period t3, if the falling time is used to detect the defect occurring in the display panel 110.

Consequently, the organic light emitting display device 100 according to the present exemplary embodiment may detect the defect occurring in the display panel 110.

Figure 7:
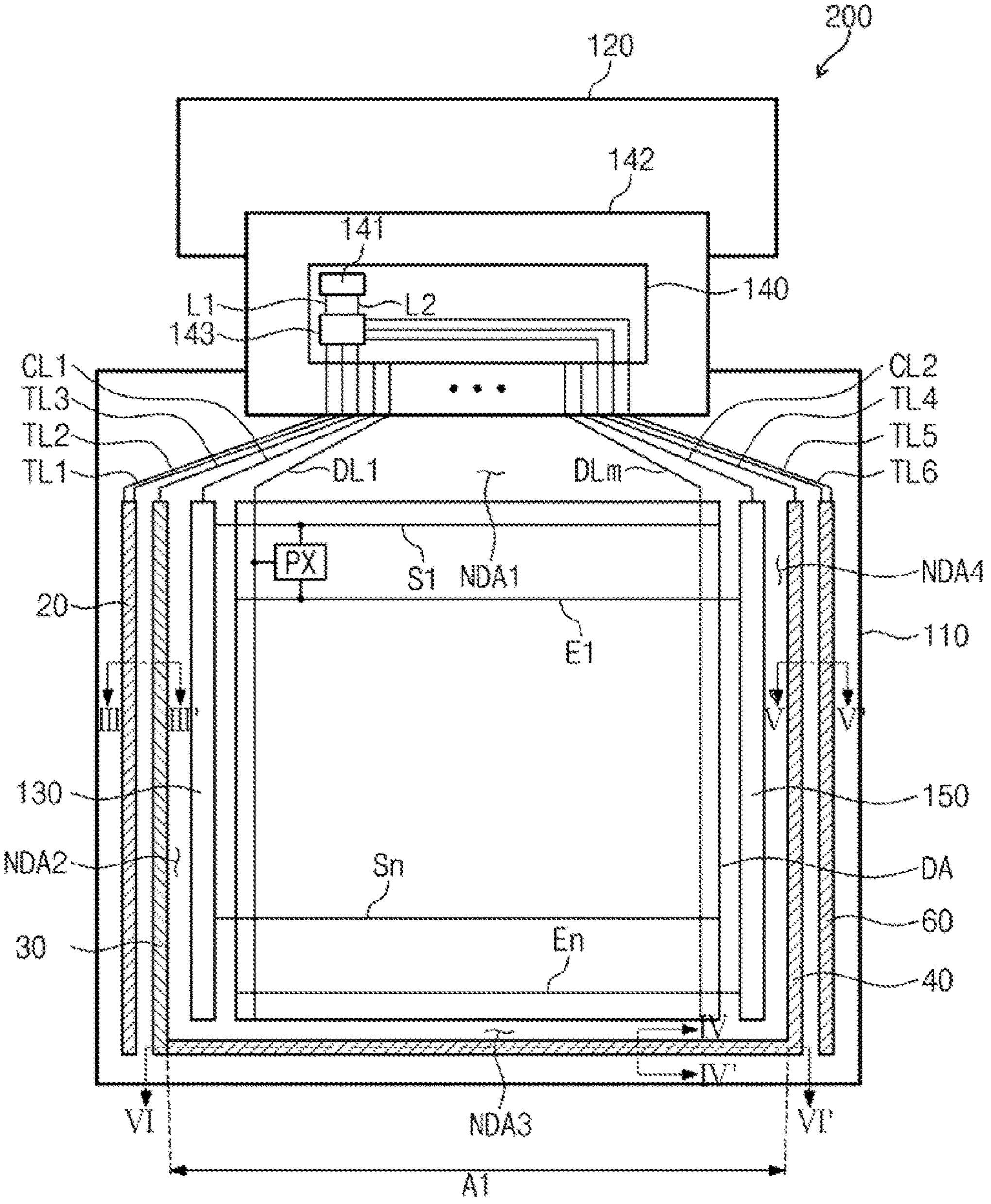
FIG. 7 is a plan view showing an organic light emitting display device constructed as another embodiment according to the principles of the present invention.
Figure 8:
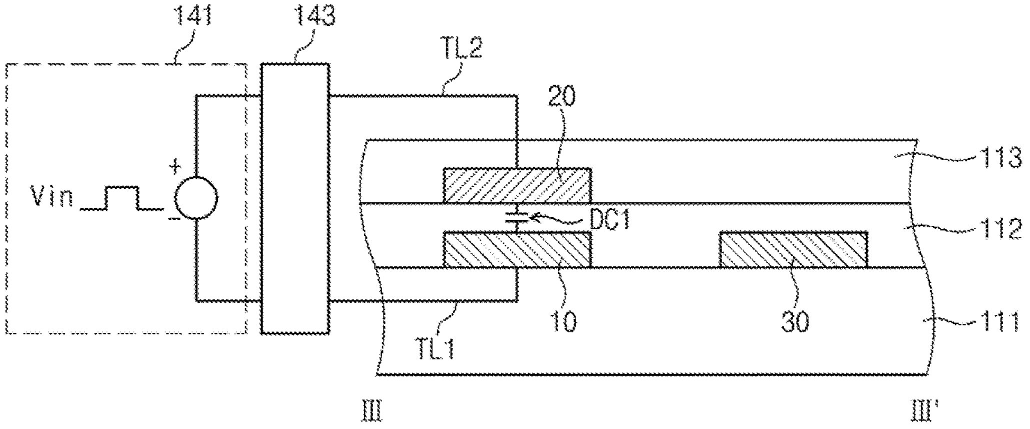
FIG. 8 is a cross-sectional view taken along a line III-III' shown in FIG. 7.
Figure 9:
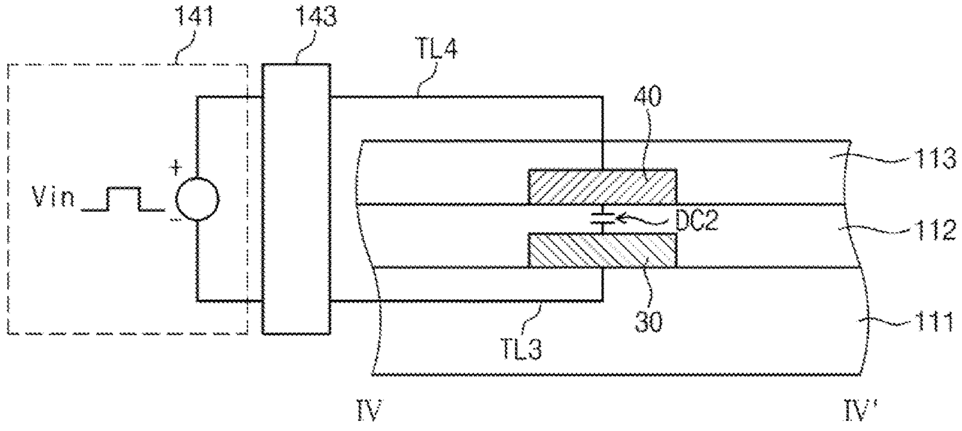
FIG. 9 is a cross-sectional view taken along a line IV-IV' shown in FIG. 7.
Figure 10:
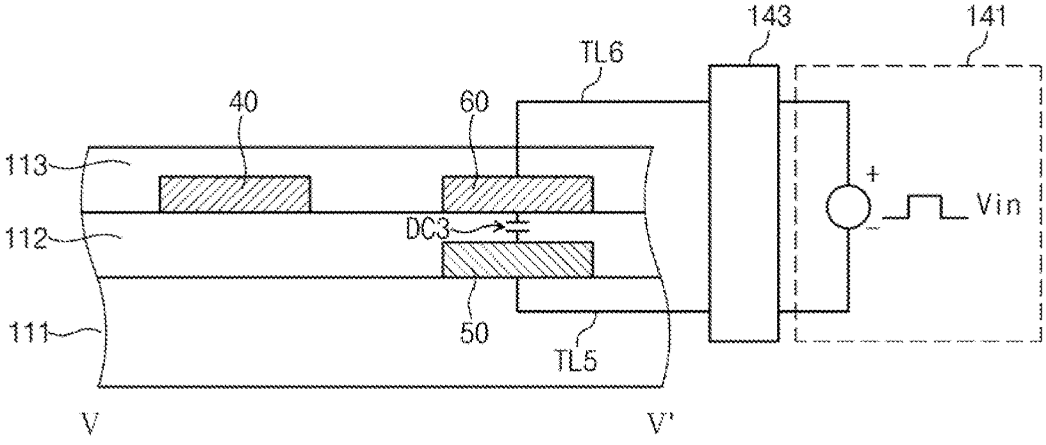
FIG. 10 is a cross-sectional view taken along a line V-V' shown in FIG. 7.
Figure 11:
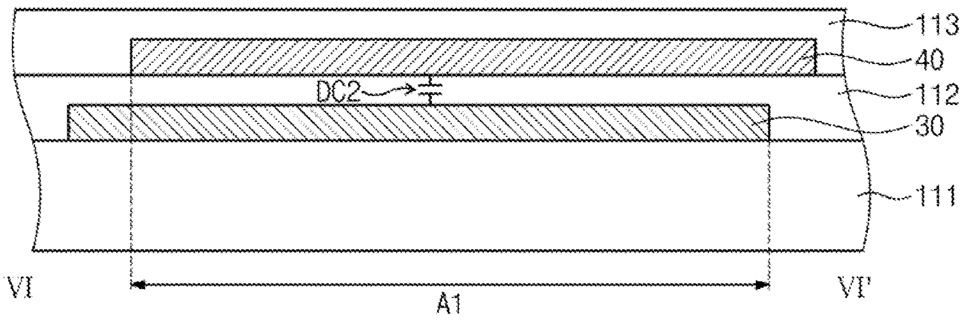
FIG. 11 is a cross-sectional view taken along a line VI-VI' shown in FIG. 7.

FIG. 7 is a plan view showing an organic light emitting display device constructed as another embodiment according to the principles of the present invention, FIG. 8 is a cross-sectional view taken along a line III-III' shown in FIG. 7, FIG. 9 is a cross-sectional view taken along a line IV-IV' shown in FIG. 7, FIG. 10 is a cross-sectional view taken along a line V-V' shown in FIG. 7, and FIG. 11 is a cross-sectional view taken along a line VI-VI' shown in FIG. 7. In FIGS. 7 to 11, the same reference numerals denote the same elements in FIGS. 1 to 5, and thus detailed descriptions of the same elements will be omitted.

The organic light emitting display device 200 shown in FIG. 7 have the same structure and function as those of the organic light emitting display device 100 shown in FIG. 1 except that the organic light emitting display device 200 includes a demultiplexer 143 and a configuration of a detecting capacitor disposed in second, third, and fourth non-display areas NDA2, NDA3, and NDA4 shown in FIG. 7 is different from that of the detecting capacitor shown in FIG. 1.

Referring to FIGS. 7 to 11, a source driver chip 140 includes a defect detection part 141, the demultiplexer 143, and first and second lines L1 and L2 connected between the defect detection part 141 and the demultiplexer 143. As described above, the defect detection part 141 generates the input signal Vin. The input signal Vin is applied to the demultiplexer 143 through the first and second lines L1 and L2.

The defect detection part 141 and the demultiplexer 143 are included in the source driver chip 140, but they should not be limited thereto or thereby. That is, the defect detection part 141 and the demultiplexer 143 may be mounted on the flexible printed circuit board 142 on which the source driver chip 140 is not mounted.

The display panel 110 includes first, second, and third detecting capacitors DC1, DC2, and DC3 respectively disposed in the second, third, and fourth non-display areas NDA2, NDA3, and NDA4. In detail, the first detecting capacitor DC1 is disposed in the second non-display area NDA2, the second detecting capacitor DC2 is disposed in the third non-display area NDA3, and the third detecting capacitor DC3 is disposed in the fourth non-display area NDA4.

As shown in FIG. 8, first and third electrodes 10 and 30 are disposed in the second non-display area NDA2 and spaced apart from each other on the first substrate 111 of the display panel 110. The first insulating layer 112 is disposed on the first substrate 111 to cover the first and third electrodes 10 and 30. The second electrode 20 is disposed on the first insulating layer 112 to overlap with the first electrode 10. The second insulating layer 113 is disposed on the first insulating layer 112 to cover the second electrode 20. The first, second, and third electrodes 10, 20, and 30 are disposed at positions outer than the scan driver 130 in the second non-display area NDA2.

The first detecting capacitor DC1 is formed by the first electrode 10, the second electrode 20 overlapped with the first electrode 10 in the second non-display area NDA2, and the first insulating layer 112 disposed between the first electrode 10 and the second electrode 20.

As shown in FIGS. 7, 9, and 11, the third electrode 30 is disposed on the first substrate 111 in the second and third non-display areas NDA2 and NDA3. The first insulating layer 112 is disposed on the first substrate 111 to cover the third electrode 30. A fourth electrode 40 is disposed on the first insulating layer 112 in the third and fourth non-display areas NDA3 and NDA4. The second insulating layer 113 is disposed on the first insulating layer 112 to cover the fourth electrode 40. The third electrode 30 and the fourth electrode 40 are overlapped with each other in a predetermined area A1 of the third non-display area NDA3.

The second detecting capacitor DC2 is formed by the third electrode 30, the fourth electrode 40 overlapped with the third electrode 30 in the predetermined area A1 of the third non-display area NDA3, and the first insulating layer 112 disposed between the third electrode 30 and the fourth electrode 40.

The second detecting capacitor DC2 is formed by the third electrode 30 disposed in the third non-display area NDA3, the fourth electrode 40 overlapped with the third electrode 30 in the predetermined area A1 of the third non-display area NDA3, and the first insulating layer 112 disposed between the third electrode 30 and the fourth electrode 40. The third electrode 30 is extended to the second non-display area NDA2 and positioned at a position outer than the scan driver 130. The fourth electrode 40 is extended to the fourth non-display area NDA4 and positioned at a position outer than the light emitting control driver 150.

As shown in FIG. 10, a fifth electrode 50 is disposed on the first substrate 111 of the display panel 110 in the fourth non-display area NDA4. The first insulating layer 111 is disposed on the first substrate 111 to cover the fifth electrode 50. The fourth and sixth electrodes 40 and 60 are disposed on the first insulating layer 112 to be spaced apart from each other. The sixth electrode 60 is disposed in the fourth non-display area NDA4 to overlap with the fifth electrode 50. The second insulating layer 113 is disposed on the first insulating layer 112 to cover the fourth and sixth electrodes 40 and 60. The fourth, fifth, and sixth electrodes 40, 50, and 60 are positioned at positions outer than the scan driver 130 in the fourth non-display area NDA4.

The third detecting capacitor DC3 is formed by the fifth electrode 50, the sixth electrode 60 overlapped with the fifth electrode 50 in the fourth non-display area NDA4, and the first insulating layer 112 disposed between the fifth electrode 50 and the sixth electrode 60.

Test lines TL1 to TL6 include first to sixth test lines TL1 to TL6. The first to sixth test lines TL1 to TL6 are connected to the demultiplexer 143 and the first to third detecting capacitors DC1 to DC3. In detail, the first and second test lines TL1 and TL2 are connected to the demultiplexer 143 and the first detecting capacitor DC1. The third and fourth test lines TL3 and TL4 are connected to the demultiplexer 143 and the second detecting capacitor DC2. The fifth and sixth test lines TL5 and TL6 are connected to the demultiplexer 143 and the third detecting capacitor DC3.

As shown in FIG. 8, the first test line TL1 is connected to the demultiplexer 143 and the first electrode 10 of the first detecting capacitor DC1. The second test line TL2 is connected to the demultiplexer 143 and the second electrode 20 of the first detecting capacitor DC1. The demultiplexer 143 applies the input signal Vin from the defect detection part 141 to the first detecting capacitor DC1 through the first test line TL1 or the second test line TL2.

As shown in FIGS. 7, 9, and 11, the third test line TL3 is connected to the demultiplexer 143 and the third electrode 30, and the fourth test line TL4 is connected to the demultiplexer 143 and the fourth electrode 40. As described above, the third electrode 30 and the fourth electrode 40 are overlapped with each other in the predetermined area A1 of the third non-display area NDA3. The second detecting capacitor DC2 is formed in the predetermined area A1 of the third non-display area NDA3. The demultiplexer 143 applies the input signal Vin from the defect detection part 141 to the second detecting capacitor DC2 through the third electrode 30 connected to the third test line TL3 or the fourth electrode 40 connected to the fourth test line TL4.

As shown in FIG. 10, the fifth test line TL5 is connected to the demultiplexer 143 and the fifth electrode 50 of the third detecting capacitor DC3, and the sixth test line TL6 is connected to the demultiplexer 143 and the sixth electrode 60 of the third detecting capacitor DC3. The demultiplexer 143 applies the input signal Vin from the defect detection part 141 to the third detecting capacitor DC3 through the fifth test line TL5 or the sixth test line TL6.

Figure 12:
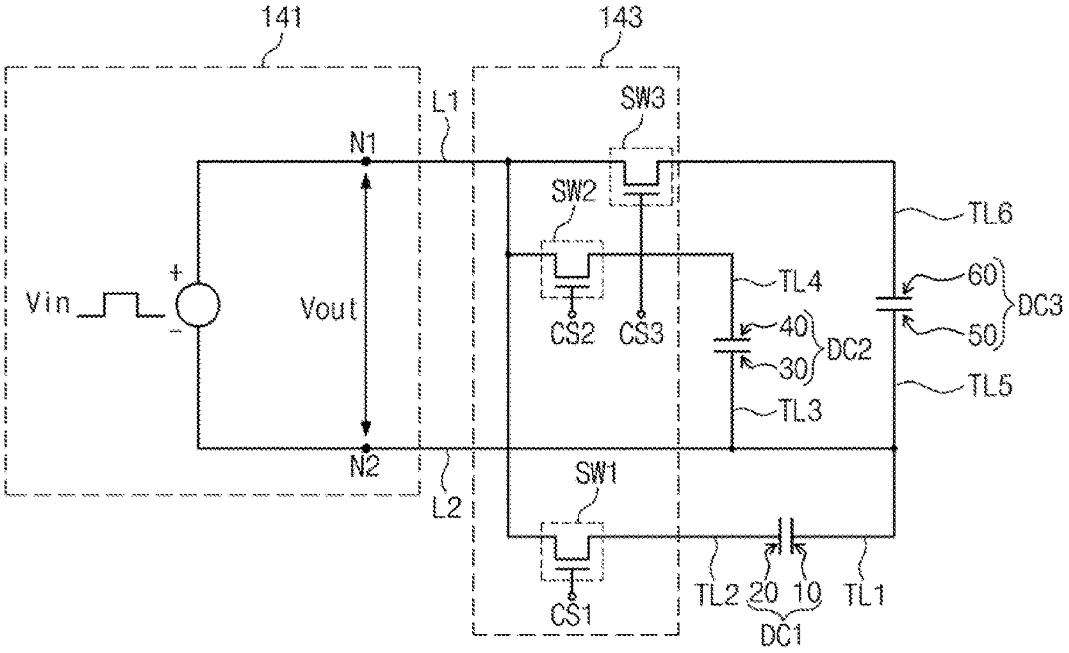
FIG. 12 is an equivalent circuit diagram showing a defect detection part, a demultiplexer, and first to third detecting capacitors shown in FIG. 7.

FIG. 12 is an equivalent circuit diagram showing the defect detection part, the demultiplexer, and the first to third detecting capacitors shown in FIG. 7.

Referring to FIG. 12, the input signal Vin generated by the defect detection part 141 is applied to the demultiplexer 143 through the first and second lines L1 and L2. The demultiplexer 143 applies the input signal Vin to one of the first, second, and third capacitors DC1, DC2, and DC3.

The defect detection part 141 includes a first node N1 connected to the first line L1 and a second node N2 connected to the second line L2. The output signal Vout may be detected between the first and second nodes N1 and N2 of the defect detection part 141.

The demultiplexer 143 includes first, second, and third switching devices SW1, SW2, and SW3. Source electrodes of the first, second, and third switching devices SW1, SW2, and SW3 are connected to the defect detection part 141 through the first line L1.

Gate electrodes of the first, second, and third switching devices SW1, SW2, and SW3 receive first, second, and third switching control signals CS1, CS2, and CS3, respectively. Thus, the first, second, and third switching devices SW1, SW2, and SW3 may be selectively turned on in response to the first, second, and third switching control signals CS1, CS2, and CS3.

A drain electrode of the first switching device SW1 is connected to the second electrode 20 of the first detecting capacitor DC1 through the second test line TL2. A drain electrode of the second switching device SW2 is connected to the fourth electrode 40 of the second detecting capacitor DC2 through the fourth test line TL4. A drain electrode of the third switching device SW3 is connected to the sixth electrode 60 of the third detecting capacitor DC3 through the sixth test line TL6.

The first test line TL1 connected to the first electrode 10 of the first detecting capacitor DC1, the third test line TL3 connected to the third electrode 30 of the second detecting capacitor DC2, and the fifth test line TL5 connected to the fifth electrode 50 of the third detecting capacitor DC3 are connected to the second line L2 of the demultiplexer 143.

Although not shown in figures, the first, second, and third switching control signals CS1, CS2, and CS3 are respectively applied to the first, second, and third switching devices SW1, SW2, and SW3 from the timing controller mounted on the driving circuit substrate 120.

The first switching device SW1 is turned on in response to the first switching control signal CS1. The turned-on first switching device SW1 applies the input signal Vin to the first detecting capacitor DC1. That is, the input signal Vin is applied to the first detecting capacitor DC1 through the first and second test lines TL1 and TL2 by the turned-on first switching device SW1.

The second switching device SW2 is turned on in response to the second switching control signal CS2. The turned-on second switching device SW2 applies the input signal Vin to the second detecting capacitor DC2. That is, the input signal Vin is applied to the second detecting capacitor DC2 through the third and fourth test lines TL3 and TL4 by the turned-on second switching device SW2.

The third switching device SW3 is turned on in response to the third switching control signal CS3. The turned-on third switching device SW3 applies the input signal Vin to the third detecting capacitor DC3. That is, the input signal Vin is applied to the third detecting capacitor DC3 through the fifth and sixth test lines TL5 and TL6 by the turned-on third switching device SW3.

Due to the configuration, the output signal Vout may be detected according to the variation of the capacitance of the first, second, and third detecting capacitors DC1, DC2, and DC3. On the basis of the detected output signal Vout, it is checked that whether the defect occurs in the display panel 110 or not. An inspecting method of the organic light emitting display device 200 shown in FIG. 7 is the same as that of the organic light emitting display device 100 shown in FIG. 1, and thus detailed description thereof will be omitted. The first detecting capacitor DC1 may be used to detect the defect occurring in the left area of the display panel 110, the second detecting capacitor DC2 may be used to detect the defect occurring in the lower area of the display panel 110, and the third detecting capacitor DC3 may be used to detect the defect occurring in the right area of the display panel 110.

Consequently, the organic light emitting display device 200 may detect the defect occurring in the display panel 110.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An organic light emitting display device, comprising:

a display panel including a display area in which a plurality of pixels are arranged and a non-display area disposed in a vicinity of the display area;

a scan driver applying scan signals to the pixels;

a source driver chip connected to the non-display area to apply data voltages to the pixels and generating an input signal;

a light emitting control driver applying light emitting control signals to the pixels;

a detecting capacitor disposed in the non-display area; and first and second test lines connected between the source driver chip and the detecting capacitor and transmitting the input signal to the detecting capacitor, wherein the non-display area comprises:

a first non-display area connected to the source driver chip;

a second non-display area;

a third non-display area disposed opposite to the first non-display area in a longitudinal direction, the display area being disposed between the first non-display area and the third non-display area; and a fourth non-display area disposed opposite to the second non-display area in a transverse direction, the display area being disposed between the second non-display area and the fourth non-display area, wherein the source driver chip outputs a change of a voltage charged in the detecting capacitor as an output signal, the detecting capacitor is disconnected from the pixels and surrounds at least portions of each of the second, third, and fourth non-display areas.

2. The organic light emitting display device of claim 1, wherein the detecting capacitor is disposed continuously along the second, third, and fourth non-display areas;

the scan driver is disposed in the second non-display area; and the light emitting control driver is disposed in the fourth non-display area.

3. The organic light emitting display device of claim 2, wherein the source driver chip comprises a defect detection part that generates the input signal and applies the generated input signal to the detecting capacitor through the first and second test lines.

4. The organic light emitting display device of claim 3, wherein the defect detection part comprises:

a first node connected to the first test line; and a second node connected to the second test line, the defect detection part outputs the output signal measured between the first node and the second node.

5. The organic light emitting display device of claim 2, wherein the detecting capacitor comprises:

a first electrode connected to the first test line;

a second electrode connected to the second test line and overlapped with the first electrode; and an insulating layer disposed between the first electrode and the second electrode.

6. The organic light emitting display device of claim 5, wherein the first electrode is disposed at a position outer than the scan driver in the second non-display area and the second electrode is disposed at a position outer than the light emitting control driver in the fourth non-display area.

7. A method of inspecting an organic light emitting display device, the method comprising:

preparing a display panel including a display area in which a plurality of pixels are arranged and a non-display area disposed adjacent to the display area, in which a detecting capacitor is disposed to provide a voltage change generated in a bending area of the display panel, and a source driver chip connected to the non-display area, and first and second test lines connected between the source driver chip and the detecting capacitor and transmitting the input signal to the detecting capacitor;

applying an input signal generated by the source driver chip to the detecting capacitor;

outputting the change of the voltage charged in the detecting capacitor as an output signal; and detecting a defect in the display panel by comparing the time signal corresponding to the voltage change of the output signal to a predetermined time period, the detecting capacitor is disconnected from the pixels, one end of each of the first and second test lines is connected to the detecting capacitor, and the other end of each of the first and second test lines is connected to the source driver chip.

8. The method of claim 7, wherein the detecting of the defect of the display panel comprises:

determining whether the display panel in a normal state when the time corresponding to the voltage change of the output signal is equal to the predetermined time period; and determining whether the display panel in an abnormal state in which the defect occurs when the time corresponding to the voltage change of the output signal is smaller than the predetermined time period.

9. The method of claim 7, wherein the organic light emitting display device further comprises:

a scan driver applying scan signals to the pixels; and a light emitting control driver applying light emitting control signals to the pixels, and wherein the source driver chip applies a data voltage to the pixels and outputs the change of the voltage charged in the detecting capacitor as the output signal.

10. The method of claim 9, wherein the non-display area comprises:

a first non-display area disposed adjacent to a first side of the display area and connected to the source driver chip;

a third non-display area disposed adjacent to a third side of the display area opposite to the first side;

a second non-display area disposed adjacent to a second side of the display area disposed between the first side and the third side, and including the scan driver disposed in the second non-display area; and a fourth non-display area disposed adjacent to a fourth side of the display area opposite to the second side, and including the light emitting control driver disposed in the fourth non-display area, the detecting capacitor is formed in the second, third, and fourth non-display areas.

11. The method of claim 10, wherein the source driver chip comprises a defect detection part that generates and applies the input signal to the detecting capacitor through the first and second test lines, the defect detection part comprises:

a first node connected to the first test line; and a second node connected to the second test line;

the defect detection part outputs the output signal measured between the first node and the second node.

12. The method of claim 10, wherein the detecting capacitor comprises:

a first electrode connected to the first test line;

a second electrode connected to the second test line and overlapped with the first electrode; and an insulating layer disposed between the first electrode and the second electrode, the first electrode is disposed at a position farther than the scan driver in the second non-display area, and the second electrode is disposed at a position farther than the light emitting control driver in the fourth non-display area.

13. An organic light emitting display device, comprising:

a display panel including a display area in which a plurality of pixels are arranged and a non-display area disposed adjacent to the display area;

a scan driver applying scan signals to the pixels;

a source driver chip connected to the non-display area to apply a data voltage to the pixels and generate an input signal;

a light emitting control driver applying light emitting control signals to the pixels;

a detecting capacitor including first, second, and third detecting capacitors disposed in the non-display area; and a plurality of test lines connected between the source driver chip and the first, second, and third detecting capacitors, wherein the non-display area comprises:

a first non-display area connected to the source driver chip;

a second non-display area;

a third non-display area disposed opposite to the first non-display area in a longitudinal direction, the display area being disposed between the first non-display area and the third non-display area; and a fourth non-display area disposed opposite to the second non-display area in a transverse direction, the display area being disposed between the second non-display area and the fourth non-display area, wherein the source driver chip selectively applies the input signal to the first, second, and third detecting capacitors through the test lines and selectively outputs a change of a voltage charged in the first, second, and third detecting capacitors as an output signal, and the detecting capacitor is disconnected from the pixels and surrounds at least portions of each of the second, third, and fourth non-display areas.

14. The organic light emitting display device of claim 13, wherein the detecting capacitor is disposed continuously along the second, third, and fourth non-display areas;

the second detecting capacitor is disposed in the third non-display area;

the scan driver and the first detecting capacitor are disposed in the second non-display area; and the light emitting control driver and the third detecting capacitor are disposed in the fourth non-display area.

15. The organic light emitting display device of claim 14, wherein the source driver chip comprises:

a defect detection part that applies an input voltage to first and second lines; and a demultiplexer connected to the first and second lines to receive the input voltage and to selectively apply the input voltage to the first, second, and third detecting capacitors.

16. The organic light emitting display device of claim 15, wherein the defect detection part comprises:

a first node connected to the first line; and a second node connected to the second line, and the defect detection part outputs the output signal measured between the first node and the second node.

17. The organic light emitting display device of claim 15, wherein the test lines comprise:

first and second test lines connected between the demultiplexer and the first detecting capacitor;

third and fourth test lines connected between the demultiplexer and the second detecting capacitor; and fifth and sixth test lines connected between the demultiplexer and the third detecting capacitor.

18. The organic light emitting display device of claim 17, wherein the demultiplexer comprises:

a first switching device turned on in response to a first switching control signal to apply the input voltage to the first detecting capacitor through the first and second test lines;

a second switching device turned on in response to a second switching control signal to apply the input voltage to the second detecting capacitor through the third and fourth test lines; and a third switching device turned on in response to a third switching control signal to apply the input voltage to the third detecting capacitor through the fifth and sixth test lines.

19. The organic light emitting display device of claim 17, wherein the first detecting capacitor comprises:

a first electrode connected to the first test line;

a second electrode connected to the second test line and overlapped with the first electrode; and an insulating layer disposed between the first electrode and the second electrode, the first and second electrodes are disposed at positions beyond than the scan driver.

20. The organic light emitting display device of claim 17, wherein the second detecting capacitor comprises:

a third electrode disposed in the third non-display area;

a fourth electrode overlapped with the third electrode in a predetermined area of the third non-display area; and an insulating layer disposed between the third electrode and the fourth electrode, the third electrode extends to the second non-display area and is disposed at a position outer than the scan driver, and the fourth electrode extends to the fourth non-display area and is disposed at a position farther than the light emitting control driver.

21. The organic light emitting display device of claim 17, wherein the third detecting capacitor comprises:

a fifth electrode connected to the fifth test line;

a sixth electrode connected to the sixth test line and overlapped with the fifth electrode; and an insulating layer disposed between the fifth electrode and the sixth electrode, the fifth and sixth electrodes are disposed at positions outer than the light emitting control driver.

* * * * *